United States Patent
Sugiyama et al.

(12)

(10) Patent No.: US 11,203,283 B2
(45) Date of Patent: Dec. 21, 2021

(54) HEADLIGHT APPARATUS

(71) Applicant: MAXELL, LTD., Kyoto (JP)

(72) Inventors: Toshinori Sugiyama, Kyoto (JP); Yasuhiko Kunii, Kyoto (JP); Koji Hirata, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/768,873

(22) PCT Filed: Nov. 13, 2018

(86) PCT No.: PCT/JP2018/042004
§ 371 (c)(1),
(2) Date: Jun. 1, 2020

(87) PCT Pub. No.: WO2019/111656
PCT Pub. Date: Jun. 13, 2019

(65) Prior Publication Data
US 2021/0155149 A1    May 27, 2021

(30) Foreign Application Priority Data

Dec. 8, 2017 (JP) .............................. JP2017-235947

(51) Int. Cl.
| B60Q 1/14 | (2006.01) |
| F21S 41/30 | (2018.01) |
| F21S 41/25 | (2018.01) |
| F21S 45/10 | (2018.01) |

(Continued)

(52) U.S. Cl.
CPC ............ B60Q 1/1438 (2013.01); F21S 41/13 (2018.01); F21S 41/25 (2018.01); F21S 41/30 (2018.01);
(Continued)

(58) Field of Classification Search
None
See application file for complete search history.

(56) References Cited

U.S. PATENT DOCUMENTS 10,823,361 B2 * 11/2020 Kunii ................... F21V 7/00
2013/0141928 A1 6/2013 Puente et al.
(Continued)

FOREIGN PATENT DOCUMENTS

| CN | 103133959 A | 6/2013 |
| CN | 106764783 A | 5/2017 |

(Continued)

OTHER PUBLICATIONS

International Search Report issued in corresponnding International Patent Application No. PCT/JP2018/042004, dated Feb. 5, 2019, with English translation.

(Continued)

*Primary Examiner* — Ashok Patel
(74) *Attorney, Agent, or Firm* — McDermott Will & Emery LLP

(57) ABSTRACT

A headlight apparatus configured to irradiate illumination light onto a road surface on which a vehicle travels includes a visible radiation lighting unit and a projector lens. The visible radiation lighting unit generates illumination light. The projector lens is provided on an optical axis of the visible radiation lighting unit, and is configured to distribute and project the illumination light irradiated from the visible radiation lighting unit. The visible radiation lighting unit has an LED, a liquid crystal display panel, and a shutter. The LED emits light. The liquid crystal display panel controls light distribution of the illumination light emitted from the LED. The shutter is provided between the liquid crystal display panel and the projector lens, and is configured to shield the liquid crystal display panel from solar light that enters through the projector lens.

9 Claims, 12 Drawing Sheets

(51) Int. Cl.
  *F21S 41/13* (2018.01)
  *F21S 41/68* (2018.01)
  *F21S 41/40* (2018.01)
  *F21W 102/20* (2018.01)

(52) U.S. Cl.
  CPC .............. *F21S 41/40* (2018.01); *F21S 41/68* (2018.01); *F21S 45/10* (2018.01); *B60Q 2200/30* (2013.01); *F21W 2102/20* (2018.01)

(56) References Cited

U.S. PATENT DOCUMENTS

2014/0362600 A1* 12/2014 Suckling ................. F21S 41/16
                                                            362/583
2016/0341384 A1* 11/2016 Hoshino ................ F21S 41/365
2016/0341391 A1* 11/2016 Yamamoto ........... B60Q 1/1438

FOREIGN PATENT DOCUMENTS

| | | |
|---|---|---|
| JP | 2012-069295 A | 4/2012 |
| JP | 2013-115046 A | 6/2013 |
| JP | 2014-049369 A | 3/2014 |
| JP | 2015-133170 A | 7/2015 |
| WO | 2015/033764 A1 | 3/2015 |

OTHER PUBLICATIONS

The First Office Action issued in corresponding CN Patent Application No. 201880078607.8, dated Jul. 12, 2021 w/Machine English Translation.

* cited by examiner (a)

(b)

HEADLIGHT APPARATUS

CROSS REFERENCE TO RELATED APPLICATIONS

This application is the U.S. National Phase under 35 U.S.C. § 371 of International Application No. PCT/JP2018/042004, filed on Nov. 13, 2018, which claims the benefits of Japanese Application No. 2017-235947, filed on Dec. 8, 2017, the entire contents of which are hereby incorporated by reference.

TECHNICAL FIELD

The present invention relates to a headlight apparatus, and particularly, the present invention relates to a technique effective in a headlight apparatus for a vehicle using a semiconductor light source element.

BACKGROUND ART

In recent years, with remarkable development of semiconductor light source elements such as an LED (Light Emitting Diode), a headlight apparatus for a vehicle using the semiconductor light source element as a light source has been utilized in automobiles and the like.

As a headlight apparatus using this type of LED, for example, a headlight for a vehicle has been proposed in which a photochromic layer is formed on all area of an outer surface of a projection lens, whereby a bad influence on a light emitting diode due to solar light is reduced (see Patent Document 1, for example).

When a photochromic layer is irradiated with an ultraviolet ray, color of the photochromic layer is changed and a transmission factor of light is reduced. Therefore, a bad influence on a light emitting diode due to the solar light is reduced by lowering the transmission factor thereof in the daytime.

RELATED ART DOCUMENTS

Patent Documents

Patent document 1: Japanese Patent Application Publication No. 2015-133170

SUMMARY OF THE INVENTION

Problems to be Solved by the Invention

When the vehicle provided with the headlight apparatus using LED as described above is under environment in which solar light showers down, the solar light is condensed by a lens or the like included in the headlight apparatus, and may go backward inside the headlight apparatus.

The headlight apparatus using the LED includes a light distribution control element, for example, liquid crystal display panel, which controls distribution of light irradiated from the LED. In a case where the solar light goes backward, there is a fear that the liquid crystal display panel and the like are irradiated and a bad influence affects the liquid crystal display panel.

Further, the technique of Patent Document 1 described above is a technique in which a photochromic layer formed on an outer surface of a lens is used as a dye for a DVD (Digital Versatile Disc), for example. When the headlight is left under solar light environment, the dye has not been changed. For this reason, it is difficult to use it as an exterior component of an automobile that is exposed to solar light over a long period.

It is thus an object of the present invention to provide a technique capable of maintaining good durability of a headlight apparatus by reducing an influence of solar light even though the headlight apparatus is under environment in which the headlight apparatus is exposed to the solar light.

The foregoing and other objects, and new features of the present invention will become more apparent from description of the present specification and the appending drawings.

Means for Solving the Problem

An outline of representative invention of the present invention disclosed in the present application and the like will briefly be explained as follows.

Namely, a representative headlight apparatus is attached to a vehicle, and is configured to irradiate illumination light onto a road surface on which the vehicle travels. This headlight apparatus includes a light source unit and a lens. The light source unit generates illumination light. The lens is provided on an optical axis of the light source unit, and is configured to distribute and project the illumination light irradiated from the light source unit.

The light source unit includes at least one semiconductor light source element, a light distribution control element, and a shielding unit. The semiconductor light source element is configured to emit light. The light distribution control element is configured to control light distribution of illumination light emitted from the semiconductor light source element. The shielding unit is provided between the light distribution control element and the lens, and is configured to shield the light distribution control element from solar light entering through the lens.

In particular, the shielding unit has an actuator configured to open and close a shutter. The actuator causes the shutter to open or close on a basis of a shutter control signal inputted from an outside.

Effects of the Invention

Effects obtained by representative invention of the present invention disclosed in the present application will briefly be explained as follows.

It is possible to realize a headlight apparatus for a vehicle, which has good durability.

BRIEF DESCRIPTIONS OF THE DRAWINGS

FIG. 3 is a development perspective view illustrating a development configuration of the headlight apparatus illustrated in

Figure 2:
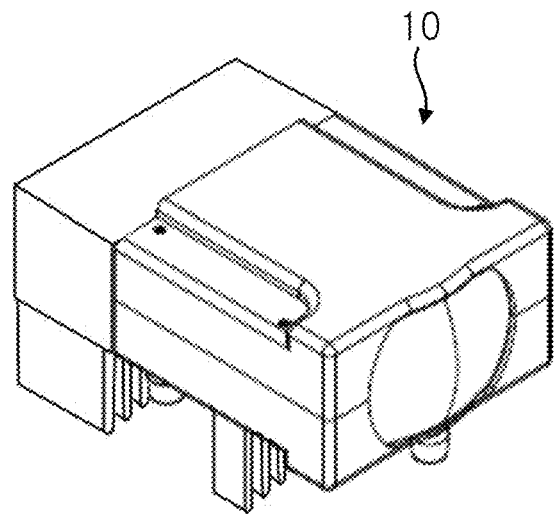
FIG. 2 is an explanatory drawing illustrating a configuration of the whole headlight apparatus illustrated in FIG. 1.
Figure 3:
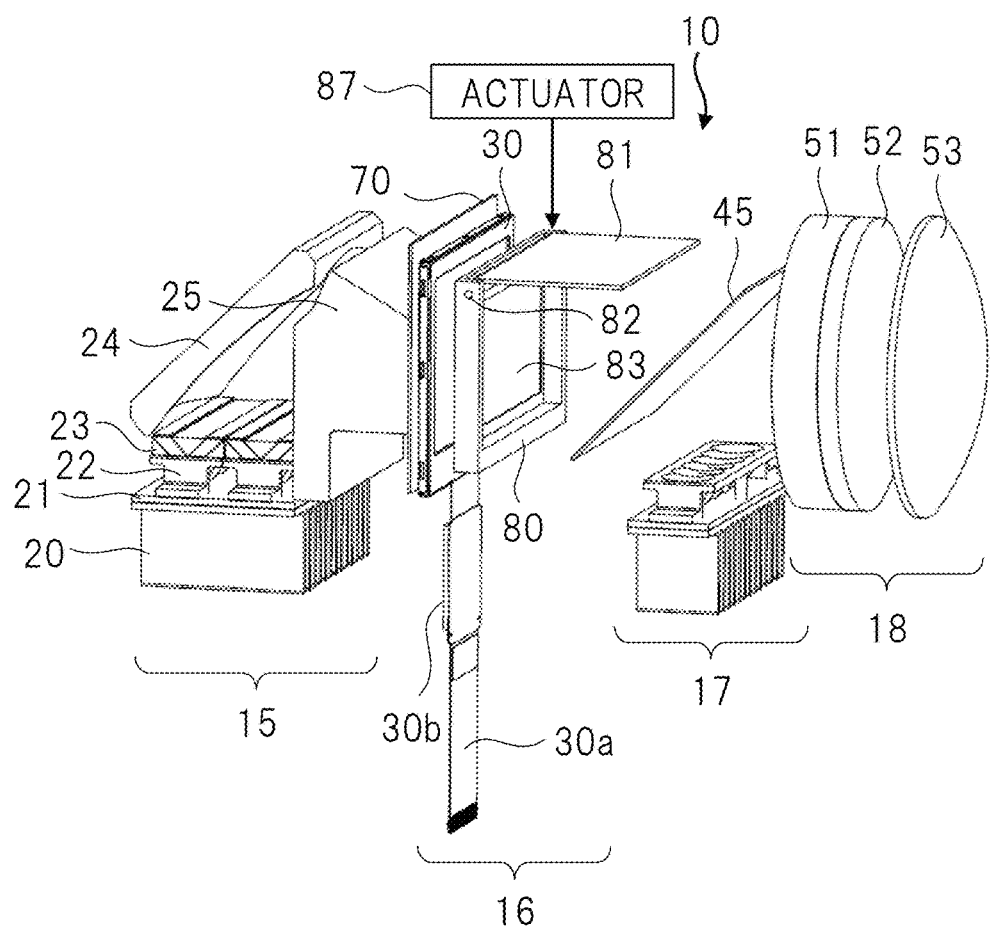
Figure 4:
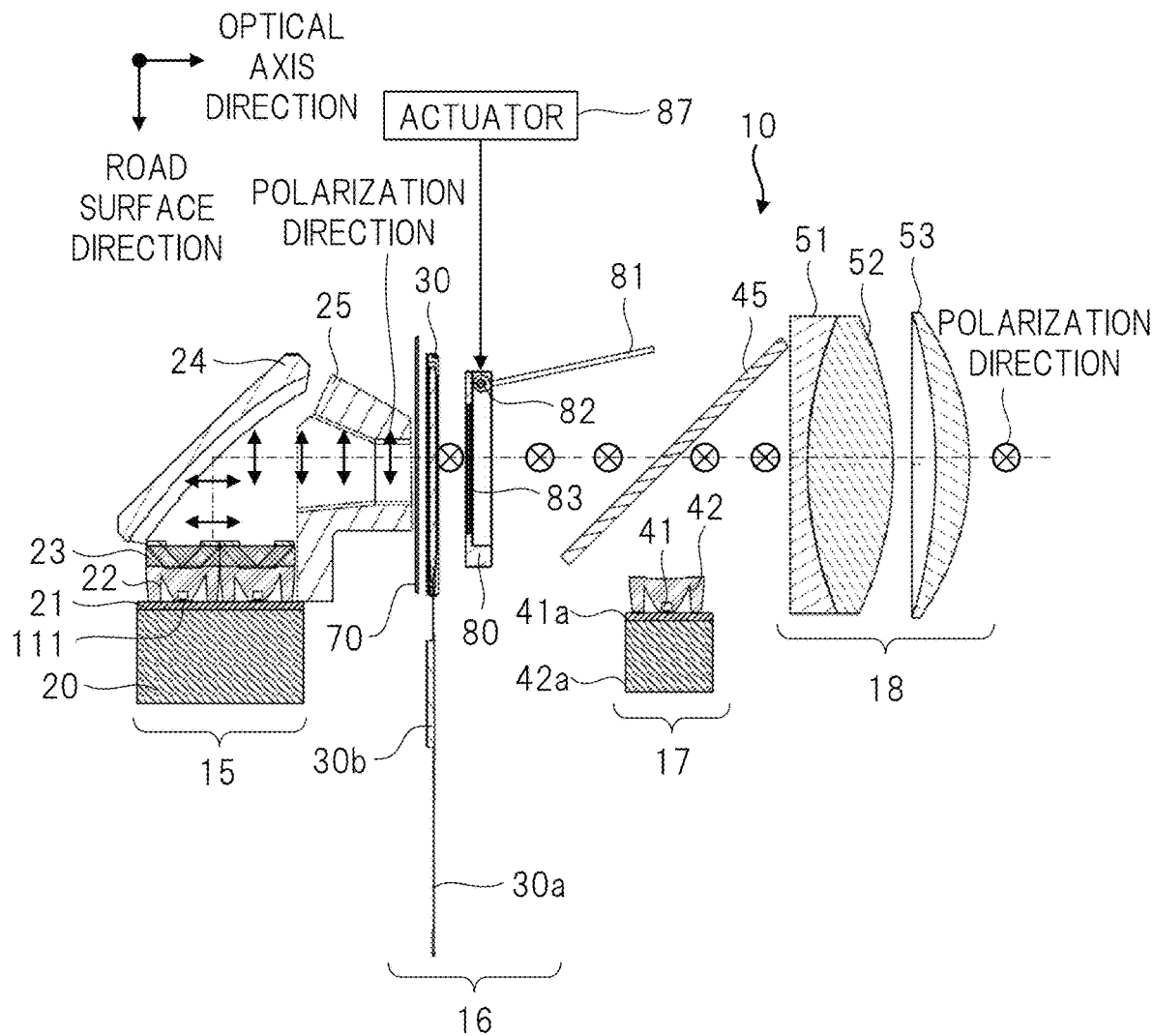
Figure 5:
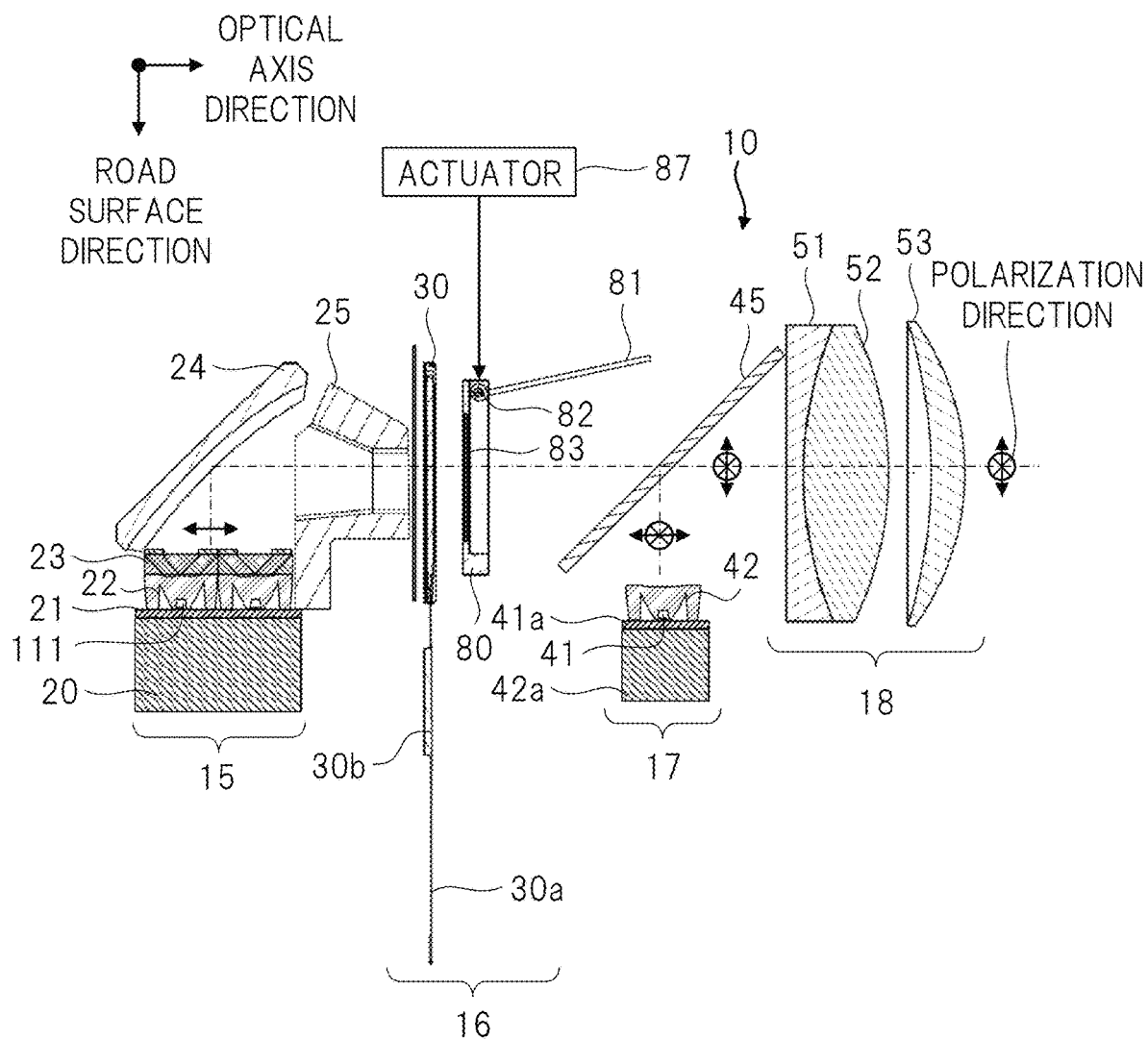
Figure 6:
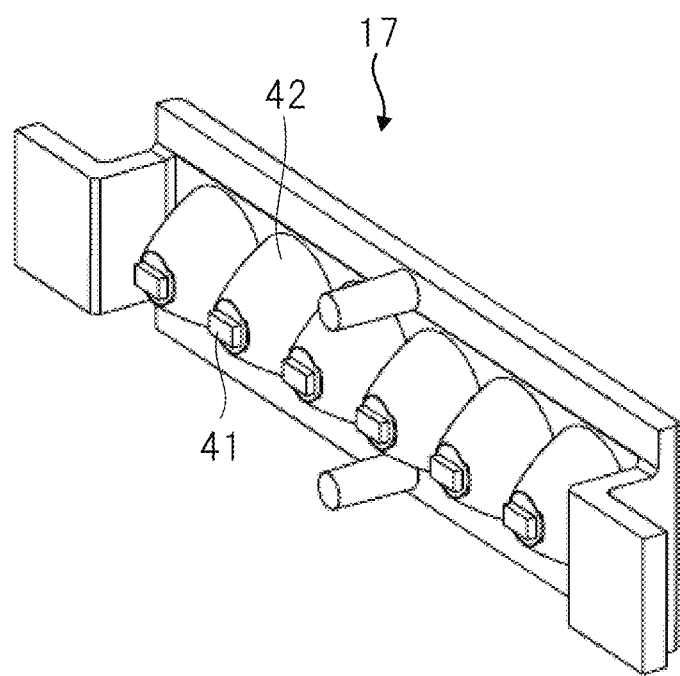
Figure 7:
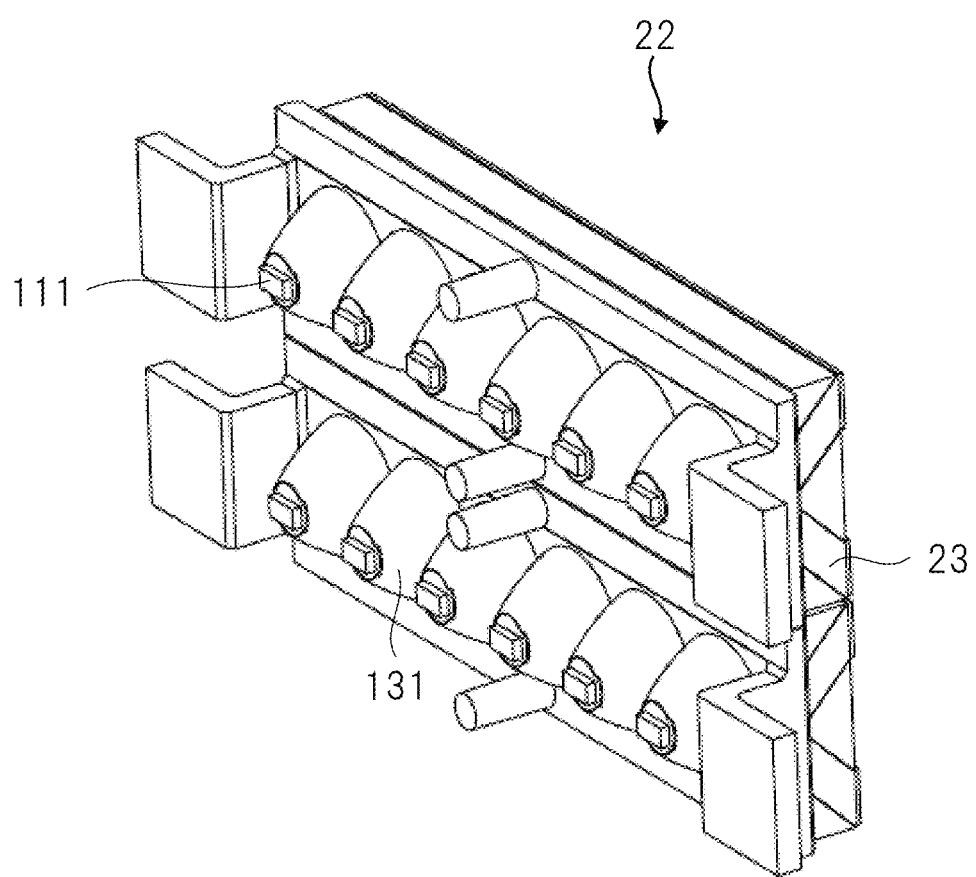
Figure 8:
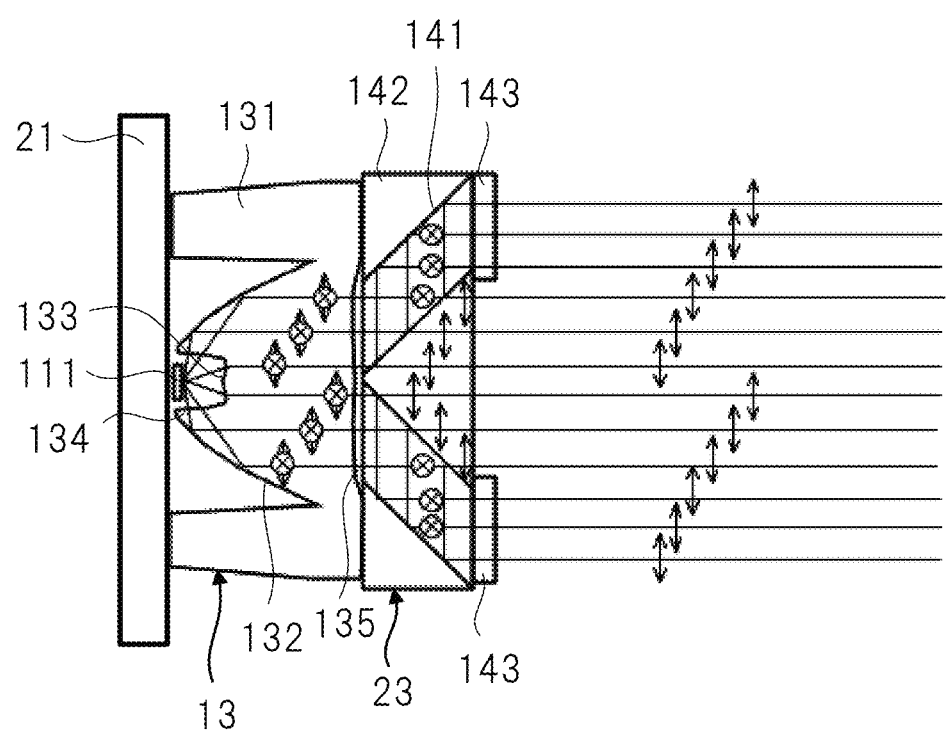
Figure 9:
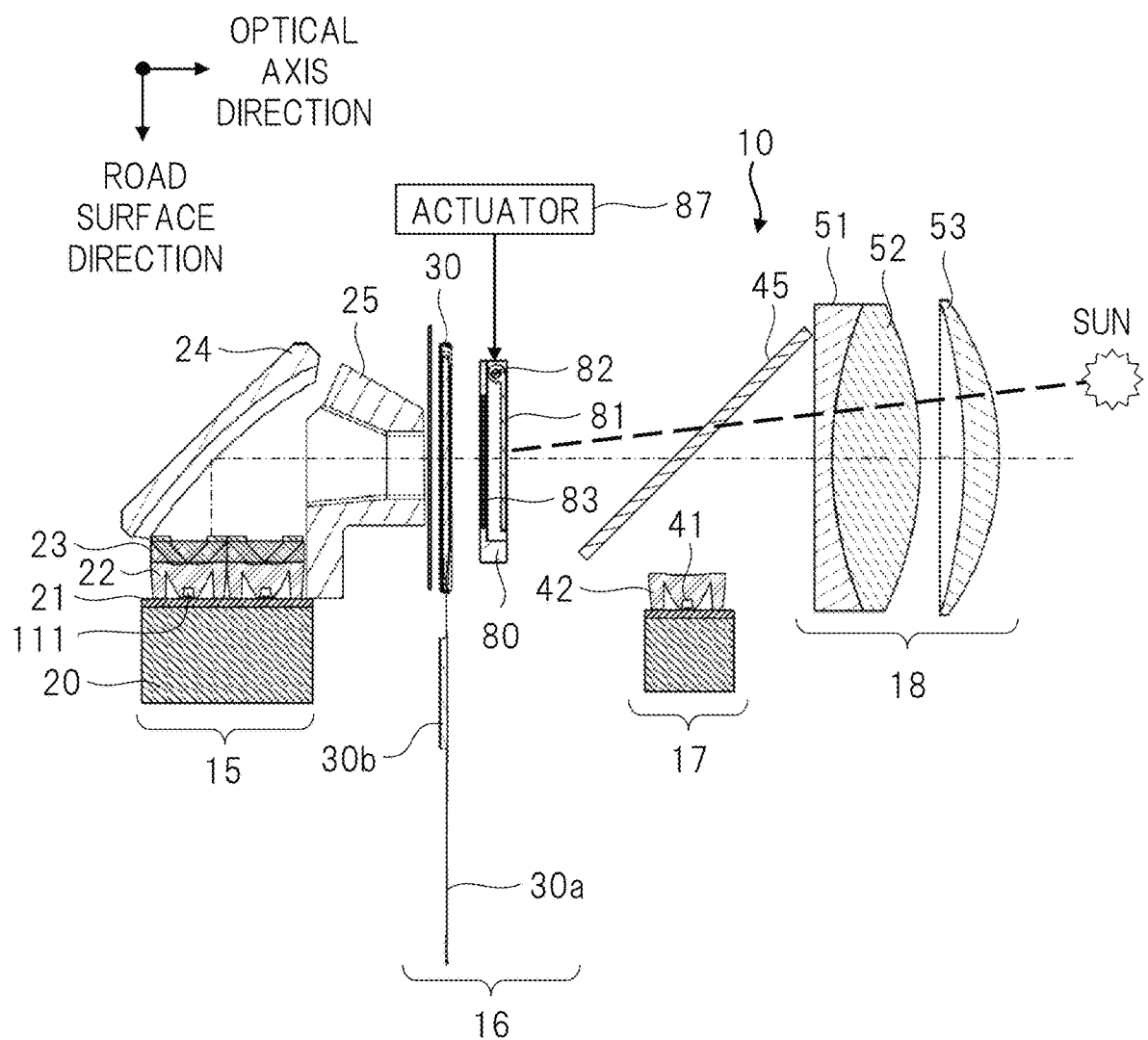
Figure 10:
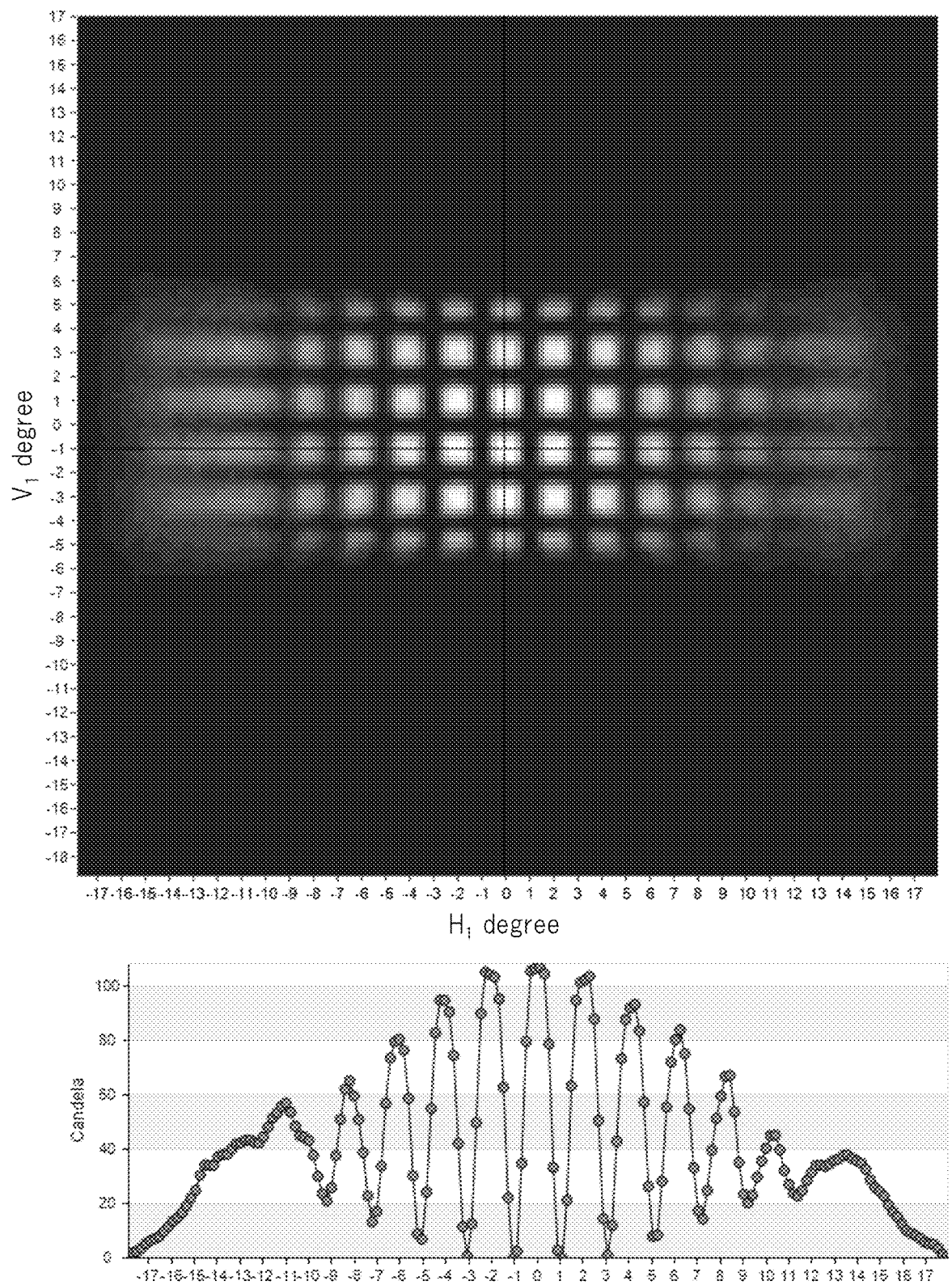
Figure 11:
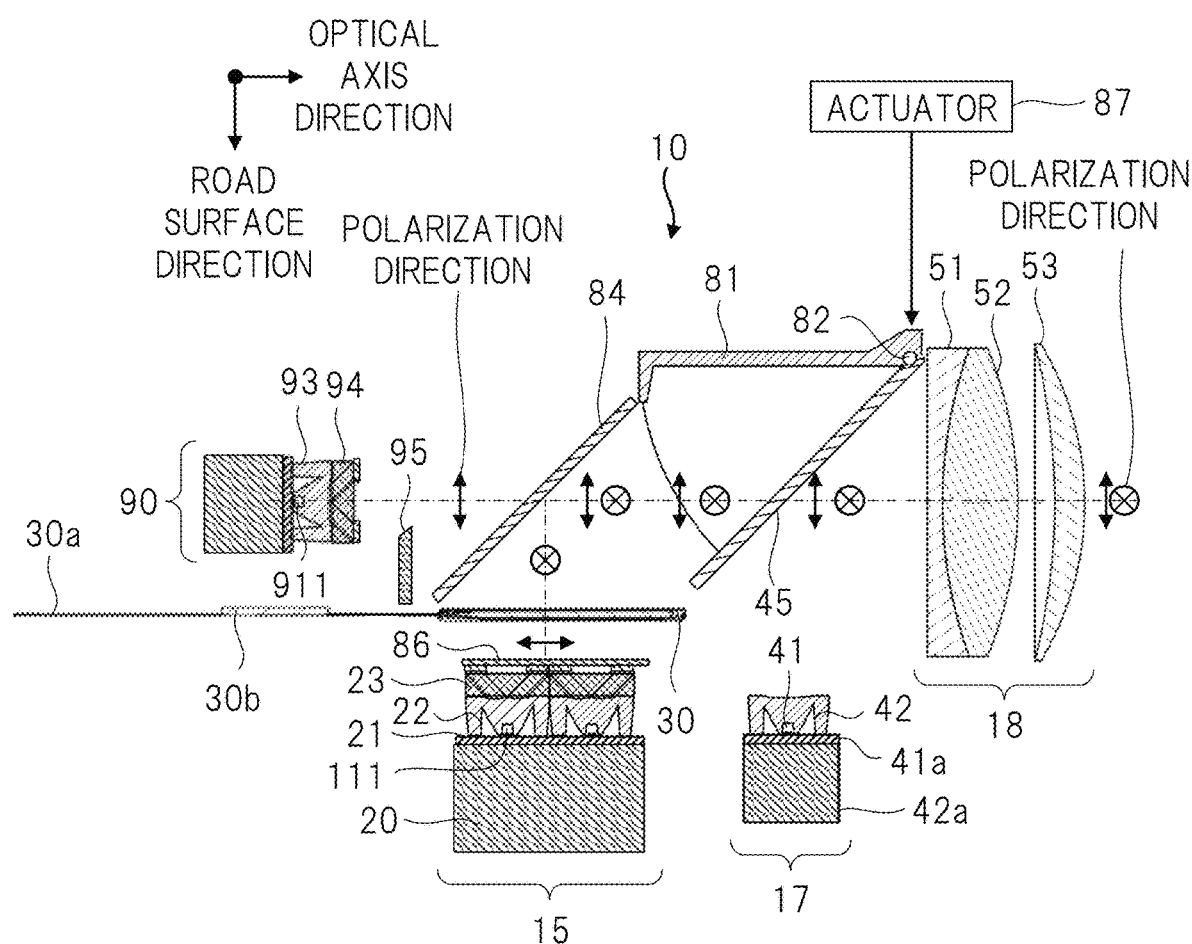
Figure 12:
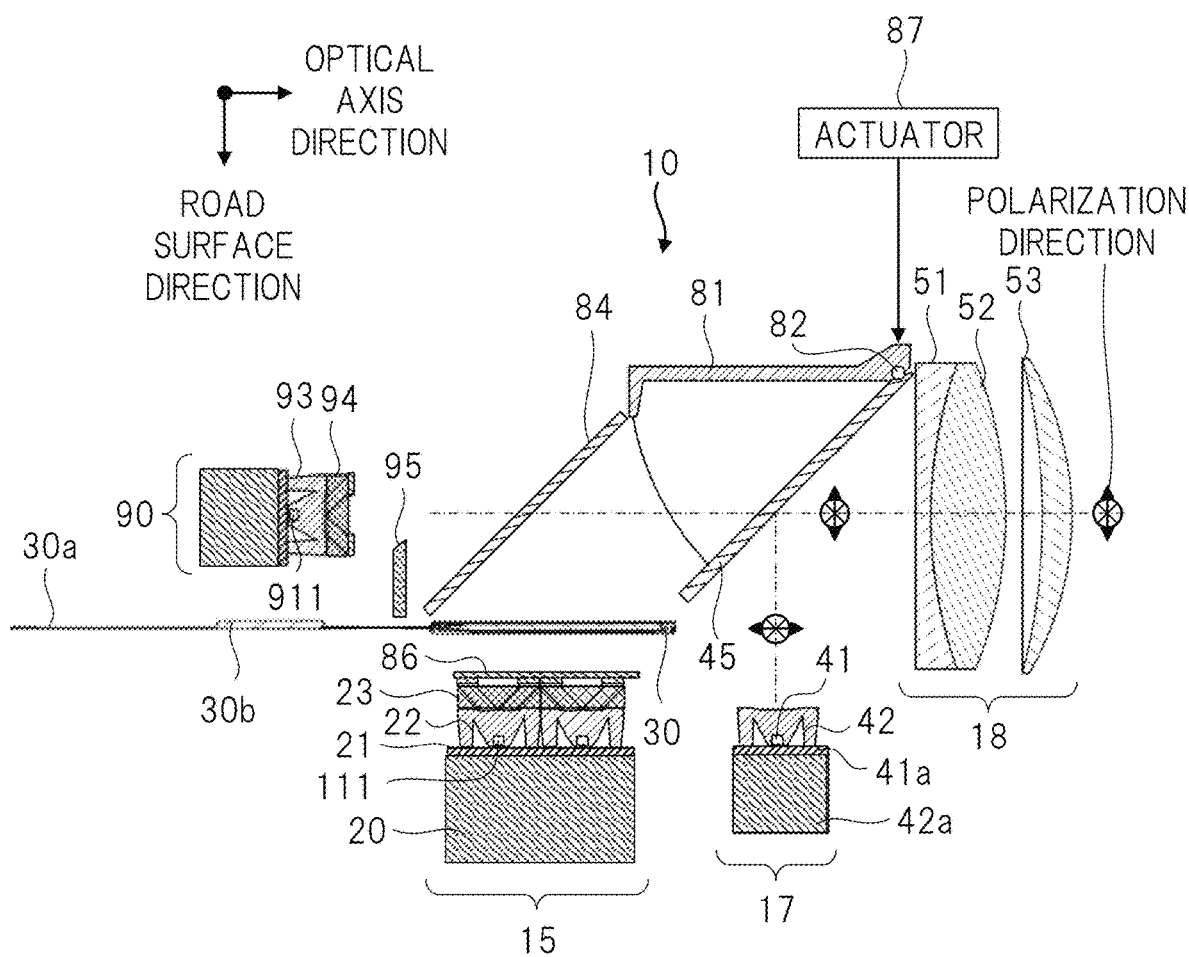
Figure 13:
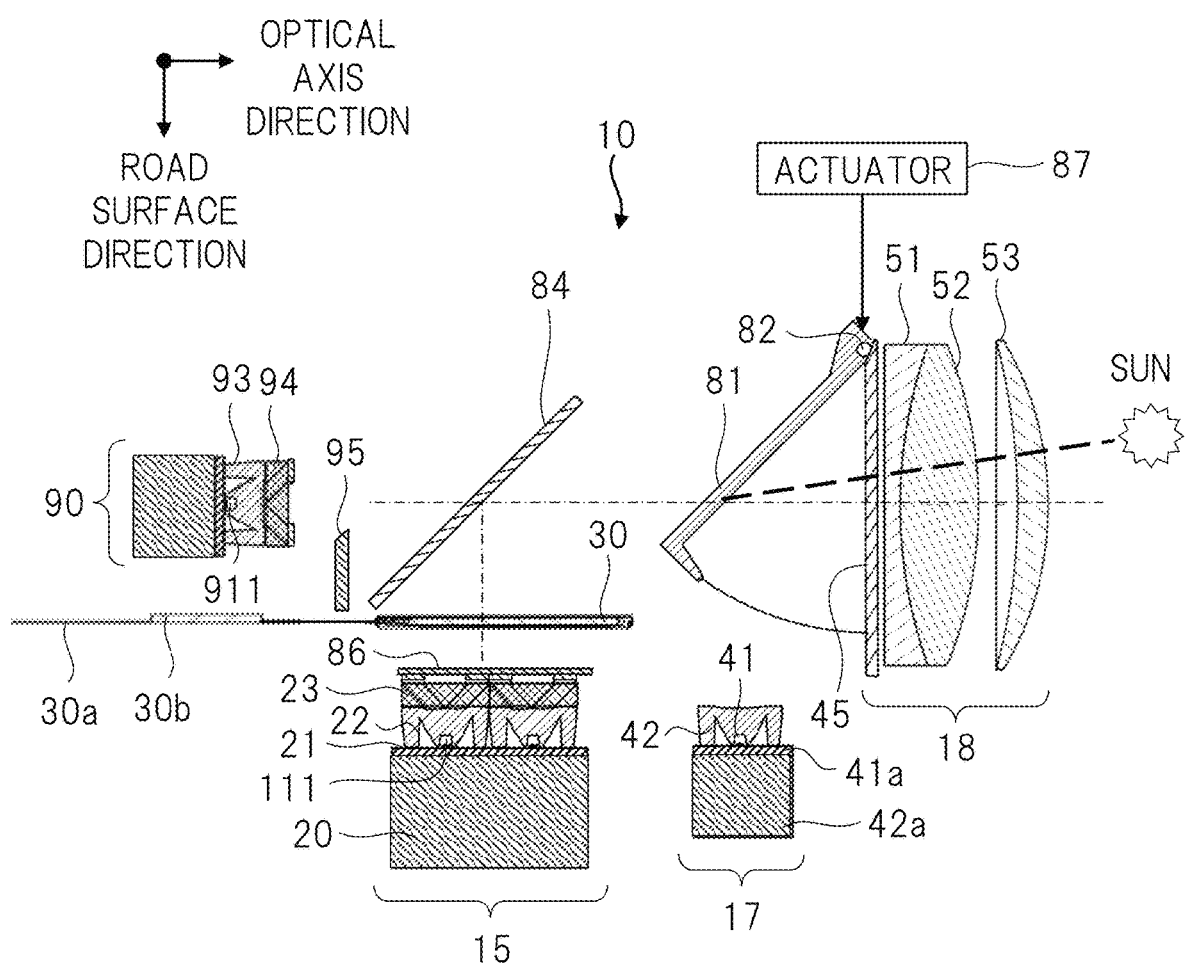

FIG. 2;

FIG. 4 is an explanatory drawing illustrating a longitudinal section of FIG. 2;

FIG. 5 is an explanatory drawing illustrating one example when the headlight apparatus illustrated in FIG. 4 irradiates an infrared ray;

FIG. 6 is an explanatory drawing illustrating one example of a configuration of a near infrared ray lighting unit included in the headlight apparatus illustrated in FIG. 4;

FIG. 7 is an explanatory drawing illustrating one example of a configuration of a collimator unit included in the headlight apparatus illustrated in FIG. 3;

FIG. 8 is an explanatory drawing of a cross section in which a part of collimators included in the collimator unit illustrated in FIG. 7 is enlarged;

FIG. 9 is an explanatory drawing of a cross section illustrating one example when a shutter included in the headlight apparatus illustrated in FIG. 4 is closed;

FIG. 10 is an explanatory drawing illustrating one example of an imaging characteristic in a projector lens included in the headlight apparatus illustrated in FIG. 3;

FIG. 11 is an explanatory drawing of a cross section illustrating one example illustrating a headlight apparatus according to a second embodiment;

FIG. 12 is an explanatory drawing illustrating one example when the headlight apparatus illustrated in FIG. 11 irradiates an infrared ray; and FIG. 13 is an explanatory drawing illustrating a cross section of one example of a state where a shutter of the headlight apparatus illustrated in FIG. 11 is closed.

DETAILED DESCRIPTION OF PREFERRED EMBODIMENTS

The same components are in principle denoted by the same reference numeral throughout the drawings for describing the embodiments, and the repetitive description thereof will be omitted.

First Embodiment

Hereinafter, the embodiments will be described in detail.
<Configuration Example of Headlight Apparatus>

Figure 1:
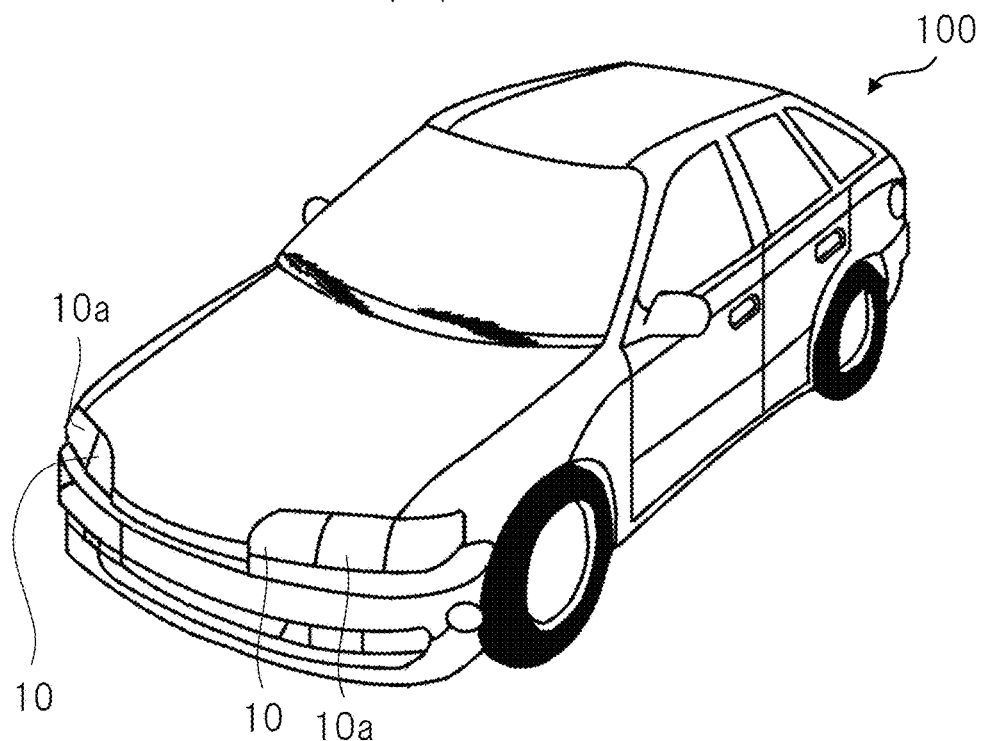
FIG. 1 is an explanatory drawing illustrating one example of an outline in a headlight apparatus provided in a vehicle according to a first embodiment.
Figure 1:
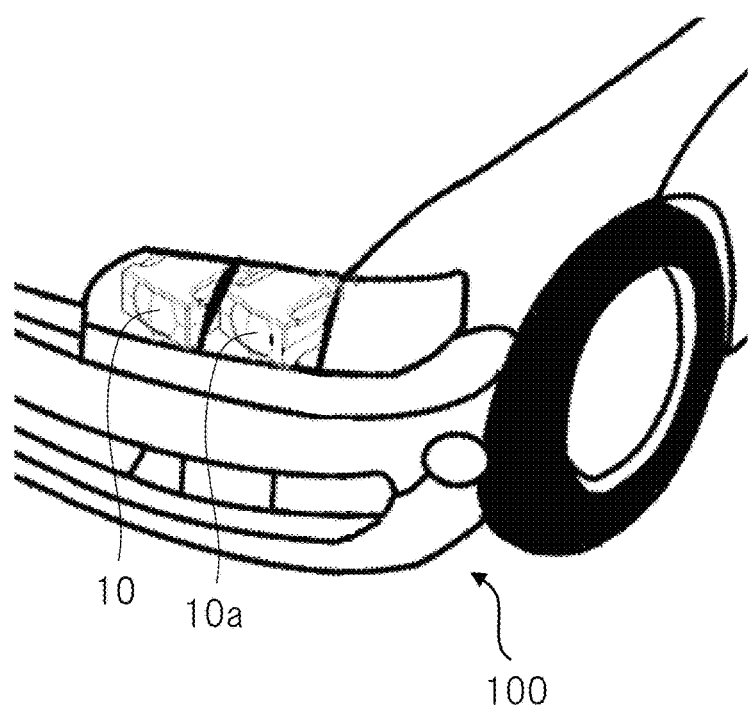

FIG. 1 is an explanatory drawing illustrating one example of an outline in a headlight apparatus 10 provided in a vehicle according to the present first embodiment. FIG. 1(a) is an outline view of a headlight apparatus 10 provided in a vehicle 100 such as an automobile. FIG. 1(b) is an outline enlarged view focusing the headlight apparatus 10 illustrated in FIG. 1(a).

FIG. 2 is an explanatory drawing illustrating a whole configuration of the headlight apparatus 10 illustrated in FIG. 1. FIG. 3 is a development perspective view illustrating a development configuration of the headlight apparatus 10 illustrated in FIG. 2. FIG. 4 is an explanatory drawing illustrating a longitudinal section illustrated in FIG. 2. FIG. 5 is an explanatory drawing illustrating one example when the headlight apparatus 10 illustrated in FIG. 4 irradiates an infrared ray.

As illustrated in FIG. 1, headlights included in the vehicle 100 are respectively provided in the vicinity of both ends of a front face of the vehicle 100. The headlight is configured by two headlight apparatuses 10 and 10a.

Hereinafter, the headlight apparatus 10 will be described with reference to FIG. 1 to FIG. 5.

The headlight apparatus 10 serves as a high beam and a light distribution control headlight. The headlight apparatus 10a is a low beam headlight, that is, a so-called passing-each-other headlight. Note that a configuration of the headlight apparatus 10 will mainly be described here.

As illustrated in FIG. 3 and FIG. 4, the headlight apparatus 10 includes a visible radiation lighting unit 15, a light distribution control unit 16, a near infrared ray lighting unit 17, a projector lens 18, a light pipe 25, and a dichroic mirror 45.

The visible radiation lighting unit 15, which is a light source unit, is a light source for the headlight apparatus 10. The light distribution control unit 16 controls light distribution of illumination light irradiated by the visible radiation lighting unit 15.

The projector lens 18 is configured by two groups of three lenses 51 to 53, for example. The projector lens 18 is an optical system for irradiating illumination light emitted from the visible radiation lighting unit 15 to a space in front of the vehicle 100 or a road surface on which the vehicle 100 travels.

The visible radiation lighting unit 15 includes a heat sink 20, an LED substrate 21, a collimator unit 22, a polarization conversion element 23, a free-form surface mirror 24 and the like. The light distribution control unit 16 includes a polarizing plate 70, a liquid crystal display panel 30, a polarizing plate holder 80, a polarizing plate 83, and the like.

A plurality of LEDs 111 and a control circuit configured to control on/off of the LEDs 111 are mounted on a main surface, that is, a mounting surface of the LED substrate 21. Each of the LEDs 111 is a semiconductor light source element. The heat sink 20 is installed on a rear surface of the LED substrate 21. Note that the number of LEDs 111 mounted in the LED substrate 21 may be singular number.

By using the LEDs 111 in this manner, it is possible to realize the headlight apparatus 10 with low power consumption and excellent for environmental protection. In addition, the LEDs 111 have long life and can be manufactured with low cost. Therefore, it is possible to reduce the cost thereof while improving reliability of the headlight apparatus 10.

The heat sink 20 is installed on the rear surface of the LED substrate 21, and radiates heat generated by the LEDs 111 and the like to circumambient air. The collimator unit 22 that is a collimator unit is provided at a side of emission surfaces of the LEDs 111, and converts light emitted from the LEDs 111 into parallel light that is parallel to the road surface. The polarization conversion element 23 is provided on a surface of this collimator unit 22, and the free-form surface mirror 24 is provided above an emission side of the polarization conversion element 23.

As illustrated in FIG. 8 (will be described later), the polarization conversion element 23 is configured by combining translucent members 141 each having a columnar shape whose cross section is a parallelogram, that is, a so-called parallelogram column, and translucent members 142 each having a columnar shape whose cross section is a triangle, that is, a so-called triangular column, and arranging them in a columnar shape in parallel to a plane orthogonal to an optical axis of the parallel light from the collimator unit 22.

A polarizing beam splitter film and a reflective film are alternately provided at a boundary surface between these adjacent two translucent members arranged in the columnar shape. Wavelength plates 143 each having a phase of 1/2λ are provided on an emission surface from which the light entering the polarization conversion element 23 and being reflected by the polarizing beam splitter film emits. The polarization conversion element 23 converts the light into polarization light vertical with respect to the road surface.

The free-form surface mirror 24 is configured so that a reflective surface thereof is formed by a free-form surface. The free-form surface mirror 24 is formed in such a shape that distribution of light at a central portion becomes stronger in order to realize illumination toward a distant place.

The polarizing plate 83 polarizes light. This polarizing plate is a so-called reflective polarizing plate that reflects polarization light orthogonal to transmission polarization light. The polarizing plate 83 is held by the polarizing plate holder 80 (will be described later).

The liquid crystal display panel 30, which is a light distribution control element, is configured to control light distribution. Specifically, by controlling a transmission factor of each area, the liquid crystal display panel 30 generates illumination light having desired light intensity distribution. A flexible substrate 30a is connected to the liquid crystal display panel 30. A control circuit 30b configured to control the liquid crystal display panel 30 on the basis of a control signal from the outside and the like are mounted in this flexible substrate 30a.

The light reflected by the free-form surface mirror 24 is introduced to the polarizing plate 70 by the light pipe 25. After the light transmits the polarizing plate 70, the liquid crystal display panel 30, and the polarizing plate 83, the transmitted light is enlarged and projected by the projector lens 18, and is irradiated to a space in front of the vehicle and a road surface.

Here, the polarizing plate 70 and the polarizing plate 83 are separated from the liquid crystal display panel 30. In other words, the polarizing plate 70 and the polarizing plate 83 are provided so as not to closely adhere to the liquid crystal display panel 30. By arranging the polarizing plate 70 and the polarizing plate 83 so as to be separated from the liquid crystal display panel 30 in this manner, it is possible to improve heat dissipation of the liquid crystal display panel 30. This makes it possible to improve reliability of the liquid crystal display panel 30.

Here, the polarizing plate 70 and the polarizing plate 83 are configured so as to be separated from the liquid crystal display panel 30. However, they may be configured so that only any one of the polarizing plate 70 and the polarizing plate 83 is separated from the liquid crystal display panel 30. It is also possible to improve heat dissipation of the liquid crystal display panel 30. Note that in a case where a degree of polarization of the light emitted from the polarization conversion element 23 is sufficiently high and a light angle matches with an angle of incident polarization light of the liquid crystal display panel, the polarizing plate 70 can be omitted.

The near infrared ray lighting unit 17 is a unit for irradiating a near infrared ray used by a near infrared camera. The near infrared camera becomes a visual assistant while traveling in the night. The dichroic mirror 45 causes visible radiation to transmit, and causes the near infrared ray to be reflected. This dichroic mirror 45 is provided above the near infrared ray lighting unit 17.

By combining the near infrared ray lighting unit 17 with the near infrared camera provided in the vehicle 100 described above, it becomes possible to recognize an object whose sight may often be lost, on the road, and this makes it possible to heighten safety further.

As illustrated in FIG. 4, the near infrared ray lighting unit 17 is configured by a near infrared LED 41, an LED substrate 41a, a collimator 42, and a heat sink 42a. As illustrated in FIG. 5, light emitted from the near infrared LED 41 is converted into diverging light with about 20° by the collimator 42. The near infrared ray lighting unit 17 selectively reflects the near infrared ray, and selectively causes the visible radiation to be transmitted.

Subsequently, the near infrared ray is reflected by the dichroic mirror 45 that selectively reflects the near infrared ray, and enters the projector lens 18 to be converted into parallel light that is substantially parallel to the road surface.

Note that the visible radiation and the near infrared ray described above may be emitted at the same time, or may be emitted separately.

<Configuration Example of Near Infrared Ray Lighting Unit>

FIG. 6 is an explanatory drawing illustrating one example of a configuration of the near infrared ray lighting unit 17 included in the headlight apparatus 10 illustrated in FIG. 4.

As illustrated in FIG. 6, a plurality of near infrared LEDs 41 is arranged in a straight line in the near infrared ray lighting unit 17. A plurality of collimators 42 is respectively provided on the near infrared LEDs 41.

In FIG. 5, an infrared ray of each of the collimators 42 illustrated in FIG. 6, reflected by the dichroic mirror 45, enters the projector lens 18 to be converted into substantially parallel light. However, an angle of view of each parallel light with respect to the projector lens 18 is different from each other. Thus, an angle of the light converted into each substantially parallel light is different, and the light becomes a horizontally long ellipsoid beam when each substantially parallel light is synthesized. This configuration allows illumination light of a near infrared ray with a narrow up-and-down width and a wide right-and-left width to be realized.

<Configuration Example of Collimator Unit>

FIG. 7 is an explanatory drawing illustrating one example of a configuration of the collimator unit 22 included in the headlight apparatus 10 illustrated in FIG. 3. FIG. 8 is an explanatory drawing of a cross section in which a part of collimators 131 included in the collimator unit 22 illustrated in FIG. 6 is enlarged.

As illustrated in FIG. 7 and FIG. 8, the collimator unit 22 is configured by arranging the collimators 131 on a surface. FIG. 7 illustrates an example in which twelve collimators 131 (=six (horizontal)×two (vertical)) are arranged in an array. The collimators 131 are respectively provided so as to correspond to the LEDs 111.

Note that each of the collimators 131 is formed by resin having translucency and heat resistance such as polycarbonate or silicone, for example. As illustrated in FIG. 8, the collimator 131 has a paraboloidal surface 132 that is an outer surface with a conical convex shape, which is obtained by rotating a substantially parabolic cross section. The collimator 131 also has a concave portion 134 at a top thereof. A convex portion 133, that is, a convex lens surface is formed at a center portion of the top. Further, the collimator 131 also has a lens surface 135 at a central portion of a flat portion. This lens surface may be a convex lens surface protruding outward or a concave lens surface becoming hollow inward.

Note that the paraboloidal surface 132 that is an outer peripheral surface forming an outer peripheral surface with a conical shape of the collimator 131 is set within a range of an angle in which light emitted from the LED 111 in a peripheral direction can be totally reflected by the inside thereof. Alternatively, a reflective surface is formed on the surface. The collimator 131 can be manufactured by general molding, for example, easily and inexpensively.

As illustrated in FIG. 5, the LEDs 111 are respectively attached to predetermined positions of the mounting surface of the LED substrate 21. The LED substrate 21 is arranged and fixed with respect to the collimator 131 so that each of the LEDs 111 is positioned at a central portion of the concave portion 134 of the corresponding collimator 131.

According to such a configuration, by the collimator 131 described above, in particular, the light emitted toward upward, that is, in a right direction of FIG. 8, from the central portion of the LED 111 among the light emitted from the LED 111 becomes parallel light by condensing the light by the two convex lens surfaces 133 and 135 respectively formed on one surface of the collimator 131 that the light from the LED 111 enters and the other surface from which the light is emitted.

Further, the light emitted toward the peripheral direction from the other portion also becomes parallel light by being reflected by the paraboloidal surface 132 that forms the outer peripheral surface of the collimator 131 with the conical shape and similarly condensed.

In other words, according to the collimator 131 in which the convex lens is formed at the central portion and the paraboloidal surface 132 is formed at the peripheral portion, it becomes possible to get out almost all of the light generated by the LEDs 111 as the parallel light. This makes it possible to improve usage efficiency of the generated light sufficiently.

As described above, according to the headlight apparatus 10 whose detailed configuration has been explained, the light emitted from the LEDs 111 is converted into substantially parallel light by the operation of the collimator unit 22. The light is then converted into linearly polarized light by the polarization conversion element 23.

Then, by forming desired light intensity distribution by the free-form surface mirror 24 and combining the liquid crystal display panel 30, which is the light distribution control element, and the polarizing plate 83, which is arranged at a subsequent stage of the liquid crystal display panel 30, detailed light distribution control for each area is made, and the light is converted into the polarization light horizontal to the road surface. Then, after transmitting the visible radiation, the light is enlarged and projected by the projector lens 18, and irradiated to the space in front of the vehicle or the road surface.

Subsequently, a configuration of the polarizing plate holder 80 that holds the polarizing plate 83 described above will be described.

The polarizing plate holder 80 has a rectangular frame shape, for example, and the polarizing plate 83 is held in an opening of the frame shape.

In FIG. 3, a shutter 81 and an actuator 87 are provided for the polarizing plate holder 80. Support pins 82 are respectively provided in the vicinity of two corner portions at an upper portion of the shutter 81.

The support pins 82 are rotatably supported by the two corner portions at the upper portion of the polarizing plate holder 80. The shutter 81 shielding unit is made of a material with high heat resistance, for example, metal or the like.

The actuator 87 opens or closes the shutter 81 by rotating the shutter 81 using the support pins 82 as a rotating shaft. FIG. 3 illustrates a state where the shutter 81 is opened by the actuator 87. When the actuator 87 closes the shutter 81, the opening of the polarizing plate holder 80 becomes a closed state by the shutter 81.

For example, the actuator 87 described above operates in conjunction with a headlight switch configured to light on or off the headlight. In a case where the headlight is lighted on, that is, when the headlight switch is turned on, the actuator 87 operates so as to open the shutter 81 on the basis of an on signal thereof.

In a case where the headlight is lighted off, that is, when the headlight switch is turned off, the actuator 87 operates so as to close the shutter 81 on the basis of an off signal thereof. These on and off signals become a headlight control signal.

Further, in a case where the vehicle 100 has a function to automatically light on or off the headlight in accordance with surrounding brightness, that is, a so-called automatic lighting function, an ECU (Electronic Control Unit) or the like, which is an electronic control apparatus configured to control the headlight such as the automatic lighting function may control the actuator 87.

<Operation Example of Shutter>

Here, an operation of the shutter 81 will be described.

FIG. 9 is an explanatory drawing of a cross section illustrating one example when the shutter 81 included in the headlight apparatus 10 illustrated in FIG. 4 is closed.

In the daytime when usage of the headlight apparatus 10 is hardly assumed, in particular, in a situation that the headlight apparatus 10 is directly irradiated with the solar light, the solar light may go backward inside the headlight apparatus 10.

In particular, in a case where the altitude of the sun is low, there is a fear that the solar light is condensed on a panel surface of the liquid crystal display panel 30 by the projector lens 18. The liquid crystal display panel 30 is made of a liquid crystal material and a resin film, which are structurally affected easily by heat.

For that reason, temperature of the liquid crystal display panel 30 increases due to the solar light condensed by the projector lens 18, whereby there is a fear that this may cause damage to the liquid crystal display panel 30.

Thus, in a case where the headlight apparatus 10 is not used, as illustrated in FIG. 9, the solar light thus condensed is blocked by closing the shutter 81. This makes it possible to reduce damage of the liquid crystal display panel 30.

The shutter 81 is closed by the actuator 87 described above. Therefore, in case of FIG. 9, the headlight switch provided in the vehicle 100 is located at the off position at which the headlight apparatus 10 is lighted off. The actuator 87 receives the off signal for the headlight switch to close the shutter 81.

Alternatively, in a case where the vehicle 100 has the automatic lighting function, the ECU configured to control the automatic lighting function lights off the headlight apparatus 10. This is because it is in the daytime. In a case where the headlight is lighted off by means of the automatic lighting function, the ECU controls the actuator 87 so as to close the shutter 81.

Note that a shutter surface, which is a surface of the shutter 81, is installed by the liquid crystal display panel 30 so as to be separated from a focal plane of the projector lens 18 by a distance L indicated by the following formula. This configuration allows a degree of condensed solar light to be reduced to about 60 times by a projector lens surface ratio, and there is no problem if a shutter material is metal.

$$L = f/8$$

Here, f is a focal distance of the projector lens 18.

<Imaging Characteristic Example of Projector Lens>

FIG. 10 is an explanatory drawing illustrating one example of an imaging characteristic in the projector lens 18 included in the headlight apparatus 10 illustrated in FIG. 3.

An upper portion of FIG. 10 illustrates a light distribution example of light projected from the projector lens 18 by the light distribution control of the liquid crystal display panel 30. A lower graph illustrates light intensity of the light distribution in the horizontal direction orthogonal to the vertical direction illustrated in the upper portion of FIG. 10.

The projector lens 18 requires excellent imaging performance at least in a range of about ±5° of an upper-and-lower direction, which is the vertical direction, and about ±7° of a right-and-left direction, which is a direction orthogonal to the vertical direction in order to selectively illuminate an object existing on a road shoulder or the like on the road other than in front of a front face of the vehicle 100, or a traffic sign installed above the road.

As is apparent from FIG. 10, it can be seen that the excellent imaging performance is realized in the range of about ±5° of the upper-and-lower direction and about ±7° of the right-and-left direction with respect to a mesh pattern formed on the liquid crystal display panel 30.

In order to obtain the imaging characteristic as illustrated in FIG. 10, as illustrated in FIG. 3 and the like described above, the projector lens 18 is configured by using the two groups of three lenses 51, 52, and 53. The lens 51 is a plano-concave lens, and (a radius of curvature)/(a conic coefficient) is −90 mm/0, for example.

The lens 52 is a biconvex lens, and (the radius of curvature)/(the conic coefficient) of the incident side and the exit side are 90 mm/0 and 80 mm/0, respectively. The lens 53 is a meniscus lens, and (the radius of curvature)/(the conic coefficient) of the incident side and the exit side are −120 mm/0 and 60 mm/−0.2, respectively.

Each of the lenses 51, 52, and 53 also has a spherical surface with good mass productivity. Note that the grass material of the lens 51 is Ohara STIM28, for example. The grass material of the lens 52 is Ohara SBSL7, for example. The grass material of the lens 53 is PMMA (resin), for example.

As described above, by providing the function to block the solar light, that is, the shutter 81 in the headlight apparatus 10, it is possible to provide the headlight apparatus 10 for the vehicle with good durability.

Second Embodiment

In the first embodiment, as illustrated in FIG. 1, the example that the headlight included in the vehicle 100 is configured from two headlight apparatuses including the headlight apparatus 10a for the low beam and the headlight apparatus 10 for the high beam has been described. However, in a present second embodiment, a headlight apparatus capable of irradiating both a high beam and a low beam will be described.

<Configuration Example of Headlight Apparatus>

FIG. 11 is an explanatory drawing of a cross section illustrating one example of the headlight apparatus 10 according to the present second embodiment. FIG. 12 is an explanatory drawing illustrating one example when the headlight apparatus 10 illustrated in FIG. 11 irradiates an infrared ray.

As described above, the headlight apparatus 10 illustrated in FIG. 11 not only has a function to irradiate the high beam, but also has a function to irradiate the low beam. Namely, the headlight apparatus 10 can irradiate both the high beam and the low beam.

As illustrated in FIG. 11, the headlight apparatus 10 includes a lighting unit 90, a visible radiation lighting unit 15, a near infrared ray lighting unit 17, a projector lens 18, a polarization element 84, a shutter 81, and a dichroic mirror 45.

In the headlight apparatus 10 illustrated in FIG. 11, configurations of the visible radiation lighting unit 15, the near infrared ray lighting unit 17, and the projector lens 18 are similar to those according to the first embodiment illustrated in FIG. 4. Thus, explanation thereof will be omitted. Further, the lighting unit 90 is configured to irradiate a low beam.

As illustrated in FIG. 12, a near infrared ray emitted from a near infrared LED 41 of the near infrared ray lighting unit 17 is reflected by the dichroic mirror 45 configured to selectively reflect the near infrared ray, and enters the projector lens 18 to be converted into parallel light that is substantially parallel to a road surface. Here, the visible radiation and the near infrared ray described above may be emitted at the same time, or may be emitted separately.

Subsequently, in the headlight apparatus 10 illustrated in FIG. 11, a polarization conversion element 23 is provided above a side of a surface of a collimator unit 22, and a diffuser plate 86 is provided above the polarization conversion element 23. Note that the polarization conversion element 23 converts the light into linear polarization light vertical with respect to the road surface in the similar manner to the first embodiment.

A liquid crystal display panel 30 that is a light distribution control element is provided above the visible radiation lighting unit 15, and the polarization element 84 is provided above the liquid crystal display panel 30 so as to be inclined by about 45° with respect to a vertical direction.

Light irradiated from the visible radiation lighting unit 15 is subjected to detailed light distribution control for each area by a combination of the liquid crystal display panel 30 and the polarization element 84. The light is converted into polarization light parallel to the road surface, is enlarged and projected by the projector lens 18, and is irradiated to a space in front of a vehicle or the road surface.

Note that in this configuration, a uniform illuminance distribution can be obtained on the liquid crystal display panel 30 by the combination of the visible radiation lighting unit 15 and the diffuser plate 86. Therefore, light distribution control can be executed with a wider viewing angle by controlling the light distribution of the liquid crystal display panel 30.

However, the headlight apparatus 10 illustrated in FIG. 11 does not have a free-form surface mirror 24 according to the first embodiment illustrated in FIG. 3, whereby the light cannot be condensed at a central portion of an optical axis. Therefore, when the headlight apparatus 10 is used as the headlight for the high beam, light intensity of the central portion may be insufficient.

Therefore, in order to solve the defect described above, there is a need to make arrangement of the collimator unit 22 in charge of the light intensity of the central portion dense, or increase an output of the LED included in that portion.

Next, the lighting unit 90 that is the headlight for the low beam is arranged at a left side of the polarization element 84 in FIG. 11.

The lighting unit 90 is configured by an LED 911, a collimator unit 93, a polarization conversion element 94, and the like. The LED 911 is arranged in the vicinity of the optical axis of the headlight apparatus 10. The collimator unit 93 corresponds to the LED 911. The number of LEDs 911 may be one, or a plural number.

Since these actions are similar to that of the visible radiation lighting unit 15 described above, detailed explanation thereof will be omitted. However, light emitted from the polarization conversion element 94 is converted into polarization light vertical with respect to the road surface, and enters the polarization element 84. Note that as illustrated in FIG. 11, the lighting unit 90 configured to irradiate the low beam includes a shade 95. This is for so-called anti-glare that avoids strong light from being irradiated to passengers including a driver who get on an oncoming vehicle or a face of an oncoming pedestrian.

The polarization element 84 has a property of transmitting polarization light vertical with respect to the road surface and reflecting the polarization light parallel to the road surface. Therefore, the light emitted from the polarization element 84 transmits the polarization element 84 effectively. Each of the shutter 81 and the dichroic mirror 45 is supported by support pins 82.

The support pins 82 are respectively provided so as to support the vicinity of two corner portions at an upper portion of the shutter 81 and the vicinity of two corner portions positioned at an upper portion of the dichroic mirror 45, and each of the shutter 81 and the dichroic mirror 45 can be rotated.

In the similar manner to the first embodiment, the shutter 81 is made of metal, for example. An actuator 87 is provided for the shutter 81 and the dichroic mirror 45.

The actuator 87 opens and closes each of the shutter 81 and the dichroic mirror 45 by using the support pins 82 as a rotating shaft. FIG. 11 illustrates a state where the shutter 81 is opened by the actuator 87.

Note that the example illustrated in FIG. 11 is configured so that each of the shutter 81 and the dichroic mirror 45 is opened or closed by one actuator 87. However, it may be configured so that the shutter 81 and the dichroic mirror 45 are respectively opened or closed by separate actuators.

<Operation Example of Shutter>

FIG. 13 is an explanatory drawing illustrating a cross section of one example of a state where the shutter 81 of the headlight apparatus 10 illustrated in FIG. 11 is closed.

As illustrated in FIG. 13, when the actuator 87 closes the shutter 81, the shutter 81 is rotated by using the support pins 82 as the rotating shaft to a state where an angle with respect to the vertical direction is about 45°, for example. By closing the shutter 81 in this manner, it is possible to block the solar light condensed by the projector lens 18.

This makes it possible to block the solar light toward the liquid crystal display panel 30 in a case where the headlight apparatus 10 is not used, and it is possible to reduce damage of the liquid crystal display panel 30 due to the solar light.

Here, in a case where the dichroic mirror 45 is left at the same position when the shutter 81 is being closed, the dichroic mirror 45 interferes with the shutter 81, thereby becoming a state where the shutter 81 cannot be closed. Therefore, when the shutter 81 is closed, the actuator 87 also rotates the dichroic mirror 45 by using the support pins 82 as the rotating shaft toward a side of the projector lens 18 similarly.

This makes it possible to prevent interference between the shutter 81 and the dichroic mirror 45 when the shutter 81 is closed.

In the similar manner to the first embodiment, the actuator 87 operates in conjunction with a headlight switch configured to light on or off the headlight, for example. Alternatively, in a case where the vehicle 100 has an automatic lighting function or the like, an ECU (Electronic Control Unit) or the like, which is an electronic control apparatus configured to control the headlight such as the automatic lighting function may control the actuator 87.

As described above, even the headlight apparatus 10 in which a high beam function and a low beam function are unified into one can reduce a situation that solar light is condensed onto the liquid crystal display panel 30. This makes it possible to provide the headlight apparatus 10 for a vehicle with good durability.

As described above, the present invention that has been made by the inventors of the present application has been described specifically on the basis of the embodiments. However, the present invention is not limited to the embodiments, and it goes without saying that the present invention may be modified into various forms without departing from the substance thereof.

In the first and second embodiments, the headlight apparatus 10 provided in the vehicle 100 has been described. However, the present invention is not limited to the embodiments described above, and may include various modification examples. For example, in the embodiments described above, the whole system has been explained in detail for explaining the present invention clearly. The present invention is not necessarily limited to one that includes all configurations that have been explained. Further, a part of the configuration of one embodiment can be replaced by a configuration of the other embodiment. a configuration of the other embodiment can be added to a configuration of one embodiment. Moreover, a part of the configuration of each of the embodiments can be added to the other configuration, deleted or replaced thereby.

REFERENCE SINGS LIST

10 . . . headlight apparatus, 10a . . . headlight apparatus, 15 . . . visible radiation lighting unit, 16 . . . light distribution control unit, 17 . . . near infrared ray lighting unit, 18 . . . projector lens, 20 . . . heat sink, 21 . . . LED substrate, 22 . . . collimator unit, 23 . . . polarization conversion element, 24 . . . free-form surface mirror, 25 . . . light pipe, 30 . . . liquid crystal display panel, 30a . . . flexible substrate, 30b . . . control circuit, 41 . . . near infrared LED, 41a . . . LED substrate, 42 . . . collimator, 42a . . . heat sink, 45 . . . dichroic mirror, 51 . . . lens, 52 . . . lens, 53 . . . lens, 70 . . . polarizing plate, 80 . . . polarizing plate holder, 81 . . . shutter, 82 . . . support pin, 83 . . . polarizing plate, 84 . . . polarization element, 86 . . . diffuser plate, 90 . . . lighting unit, 93 . . . collimator unit, 94 . . . polarization conversion element, 95 . . . shade, 100 . . . vehicle, 111 . . . LED, 131 . . . collimator

The invention claimed is:

1. A headlight apparatus for irradiating a road surface, on which a vehicle travels, with illumination light, the headlight apparatus being attached to the vehicle, the headlight apparatus comprising:
   a light source unit configured to generate the illumination light;
   a lens provided on an optical axis of the light source unit, the lens being configured to distribute and project the illumination light from the light source unit;
   a light distribution control element configured to control light distribution of the illumination light emitted from the light source unit; and
   a shielding unit provided between the light distribution control element and the lens, the shielding unit being configured to control whether the light distribution control element from solar light is shield or not, the solar light entering through the lens,
   wherein the light source unit includes:
      at least one semiconductor light source element configured to emit light;
      a collimator unit configured to convert the light emitted from the semiconductor light source element into substantially parallel light; and
      a polarization conversion unit configured to convert the converted substantially parallel light into linearly polarized light.

2. The headlight apparatus according to claim 1, wherein the lens is configured by a plurality of lenses.

3. The headlight apparatus according to claim 2, wherein the number of lenses is three.

4. The headlight apparatus according to claim 1, wherein the light distribution control element is a liquid crystal display panel for controlling a transmission factor.

5. The headlight apparatus according to claim 1, further comprising:
   a near infrared ray irradiating unit configured to irradiate a near infrared ray, a dashboard camera mounted on the vehicle using the near infrared ray.

6. The headlight apparatus according to claim 4, further comprising:
   a polarization element configured to polarize the light whose light distribution is controlled by the liquid crystal display panel,
   wherein the polarization element is provided so as to be separated from the liquid crystal display panel.

7. The headlight apparatus according to claim 4, further comprising:
   a polarization element configured to polarize the light whose light distribution is controlled by the liquid crystal display panel, wherein the polarization element is a reflection type polarization element that reflects polarization light orthogonal to transmission polarization light.

8. The headlight apparatus according to claim 1,
   wherein the light source unit further includes:
      a free-form surface mirror configured to reflect and condense the light converted by the polarization conversion unit toward the light distribution control element.

9. The headlight apparatus according to claim 5, wherein an infrared ray irradiated by the near infrared ray irradiating unit is synthesized, by a dichroic mirror, with visible radiation whose light distribution is controlled by the light distribution control element, and the synthesized ray is emitted from the lens.

* * * * *